United States Patent
Hiro et al.

(10) Patent No.: US 6,875,362 B2
(45) Date of Patent: Apr. 5, 2005

(54) WASTE WATER TREATING METHOD, WASTE WATER TREATING APPARATUS, AND WASTE WATER TREATING SYSTEM

(75) Inventors: Naoki Hiro, Osaka (JP); Noriyuki Nakazawa, Tokyo (JP)

(73) Assignee: Sanyo Electric Co., Ltd., Moriguchi (JP)

(*) Notice: Subject to any disclaimer, the term of this patent is extended or adjusted under 35 U.S.C. 154(b) by 10 days.

(21) Appl. No.: 10/257,363

(22) PCT Filed: Feb. 22, 2002

(86) PCT No.: PCT/JP02/01599
§ 371 (c)(1),
(2), (4) Date: May 6, 2003

(87) PCT Pub. No.: WO02/068340
PCT Pub. Date: Sep. 6, 2002

(65) Prior Publication Data
US 2003/0168411 A1 Sep. 11, 2003

(30) Foreign Application Priority Data
Feb. 28, 2001 (JP) .......................................... 2001-054819
Feb. 28, 2001 (JP) .......................................... 2001-054834

(51) Int. Cl.$^7$ .............................. C02F 1/461; B03C 1/00
(52) U.S. Cl. ........................ 210/748; 210/754; 210/757; 210/205; 210/903; 210/906; 205/742; 204/668
(58) Field of Search ................................ 210/631, 748, 210/749, 754, 756, 757, 192, 198.1, 205, 903, 906; 205/742, 761; 204/554, 660, 668, 242

(56) References Cited

U.S. PATENT DOCUMENTS

| | | | | | |
|---|---|---|---|---|---|
| 4,029,575 | A | * | 6/1977 | Bykowski et al. | 210/605 |
| 5,376,240 | A | * | 12/1994 | Kaczur et al. | 205/617 |
| 5,437,776 | A | * | 8/1995 | Schwabegger et al. | 205/761 |
| 6,645,366 | B2 | * | 11/2003 | Iseki et al. | 205/742 |

FOREIGN PATENT DOCUMENTS

| | | | |
|---|---|---|---|
| JP | 54-16844 | | 2/1979 |
| JP | 54016844 A | * | 2/1979 |
| JP | 2000-117259 | | 4/2000 |
| JP | 2000-117259 A | * | 4/2000 |
| JP | 2000-334465 | | 12/2000 |
| JP | 2001-252667 | | 9/2001 |

* cited by examiner

Primary Examiner—Frank M. Lawrence
(74) Attorney, Agent, or Firm—Armstrong, Kratz, Quintos, Hanson & Brooks, LLP (57) ABSTRACT

There are proposed a waste water treating method, a waste water treating appratus and a waste water treating system which are capable of treating a nitrogen compound and a phosphorus compound in the same treating vessel and treating waste water containing a nitrogen compound and a phosphorus compound efficiently. The waste water treating method is a method for treating a nitrogen compound and a phosphorus compound in for-treatment water by an electro-chemical process, wherein a metal material constituting a cathode is a conductive material, a conductive material constituting an anode is an insoluble material or carbon, and there is carried out at lease one of a step of adding calcium chloride to the for-treatment water and a step of immersing an iron material in the for-treatment water.

18 Claims, 6 Drawing Sheets

WASTE WATER TREATING METHOD, WASTE WATER TREATING APPARATUS, AND WASTE WATER TREATING SYSTEM

BACKGROUND OF THE INVENTION

1. Technical Field

The present invention relates to a waste water treating method, appratus and system for waste water which contains phosphoric acid, a phosphorus compound, phosphate ions, organic nitrogen, nitrite nitrogen, nitrate nitrogen and ammonia nitrogen.

2. Background Art

It has conventionally been well known that existence of a nitrogen compound and a phosphorus compound is one of causes of eutrophication of rivers and lakes. It is also well known that the phosphorus compound and the nitrogen compound exist in domestic waste water and industrial waste water in large amounts and are difficult to purify. Heretofore, as a purification treatment for the nitrogen compound, a biological treatment has been generally implemented. The biological treatment comprises two steps, i.e. a nitrification step for converting ammonia nitrogen to nitrate nitrogen and a denitrification step for converting nitrate nitrogen to nitrogen gas.

Meanwhile, a variety of techniques for treating the phosphorus compound have been proposed, and a lime agglomeration/precipitation technique is known for domestic waste water. This is a technique for removing phosphate ions in water to be treated (hereinafter, "water to be treated" will be referred to as "for-treatment water") by reacting the phosphate ions with calcium ions so as to condense and precipitate the phosphate ions as calcium hydroxyapatite which is a water-insoluble salt.

However, the conventional biological treatment has problems that it requires two different reaction vessels and that because the treatment proceeds slowly, its treatment efficiency is low. Further, the conventional technique has a problem that it requires a large-capacity apparatus since it does not treat a nitrogen compound and a phosphorus compound which are contained in for-treatment water simultaneously.

Further, in the biological treatment, there is another problem that large-capacity aerobic and anaerobic vessels are required for keeping nitrifying bacteria and denitrifying bacteria, thereby inducing an increase in equipment construction costs and an apparatus installation area. There is still another problem that since the denitrifying bacteria are largely influenced by an ambient temperature environment, components contained in for-treatment water and the like, and in particular, during the winter season when the temperature is low, their activities are lowered to deteriorate the denitrifying action, resulting in unstable processing efficiency.

In addition, in the case of the technique for treating the phosphorus compound, since a pH of the treated water after the condensation/precipitation of the phosphorus compound is high, the alkaline treated water resulting from the treatment of the phosphorus compound must be neutralized. Further, the technique also has a problem that maintenance is difficult due to a large amount of lime used.

Under the circumstances, the present invention has been invented to solve the technical problems of the prior art and proposes a waste water treating method, a waste water treating appratus and a waste water treating system which are capable of treating a nitrogen compound and a phosphorus compound in the same treating vessel and treating waste water containing a nitrogen compound and a phosphorus compound efficiently.

SUMMARY OF THE INVENTION

The present invention is a waste water treating method for treating a nitrogen compound and a phosphorus compound in for-treatment water by an electrochemical process, wherein a metal material constituting a cathode is a conductive material, a conductive material constituting an anode is an insoluble material or carbon, and there is carried out at lease one of a step of adding calcium chloride to the for-treatment water and a step of immersing an iron material in the for-treatment water.

Further, in addition to the above invention, the waste water treating method of the present invention is characterized in that a conductive material containing or covered with an element in the group Ib or IIb of the periodic system is used as the metal material constituting the cathode.

Further, in addition to the above inventions, the waste water treating method of the present invention is characterized in that when the iron material is not immersed in the for-treatment water, a molar ratio of calcium ions contained in the for-treatment water to phosphate ions contained in the for-treatment water is 5/3 or more.

A waste water treating apparatus of the present invention is an apparatus for treating a nitrogen compound and a phosphorus compound in for-treatment water by an electrochemical process, the apparatus comprising a treating vessel for reserving the for-treatment water, a cathode which is at least partially immersed in the for-treatment water and which is made of a conductive material, an anode which is at least partially immersed in the for-treatment water and which is made of a conductive insoluble material or carbon, and at least either one or both of calcium chloride addition means for adding calcium chloride to the for-treatment water and an iron material to be immersed in the for-treatment water.

Further, in addition to the above invention, the waste water treating apparatus of the present invention is characterized in that a conductive material containing or covered with an element in the group Ib or IIb of the periodic system is used as the conductive material constituting the cathode.

Further, in addition to the above inventions, the waste water treating apparatus of the present invention is characterized in that when the iron material is immersed in the for-treatment water, the iron material is positioned between the anode and the cathode.

Further, in addition to the above inventions, the waste water treating apparatus of the present invention is characterized in that the iron material is positioned beyond a line connecting an end of the anode to an end of the cathode.

Further, in addition to the above inventions, the waste water treating apparatus of the present invention is characterized in that when the iron material is immersed in the for-treatment water, the iron material is fixed to the treating vessel by positioning means, and the positioning means can change a spacing between the iron material and the anode or the cathode by moving the iron material freely.

Further, in the above inventions, the waste water treating method or apparatus of the present invention is characterized in that the for-treatment water is water treated in a biological process purifying vessel.

A waste water treating system of the present invention has a waste water treating apparatus for treating a nitrogen compound and a phosphorus compound in for-treatment water by the waste water treating method of the above inventions or the waste water treating apparatus of the above inventions disposed subsequently to a biological process purifying vessel.

DETAILED DESCRIPTION OF THE PREFERRED EMBODIMENT

Figure 1:
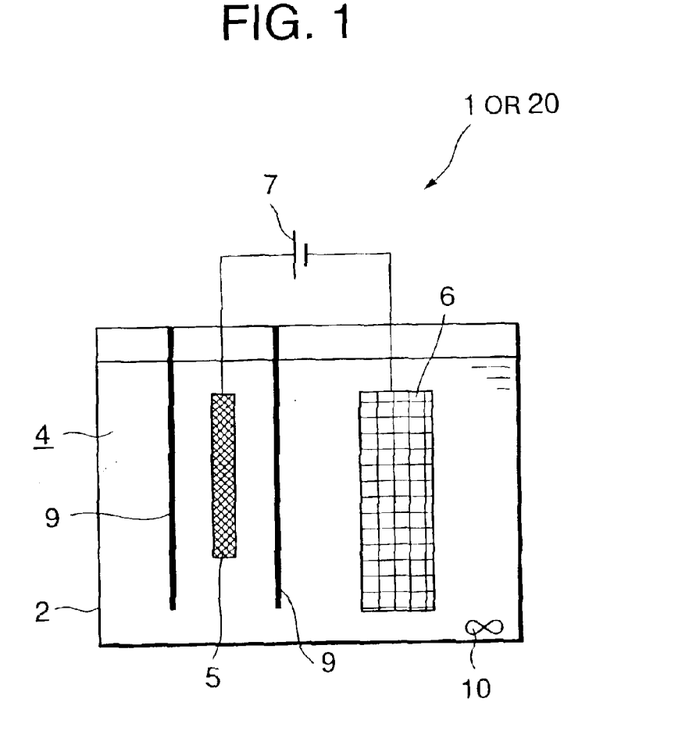
FIG. 1 is an explanatory diagram showing an outline of a waste water treating apparatus for implementing a waste water treating method of the present invention.

Hereinafter, embodiments of the present invention will be described in detail with reference to the accompanying drawings. A waste water treating apparatus 1 in the present embodiment comprises a treating vessel 2 which constitutes a treating chamber 4, the chamber 4 having a waste water inlet and a waste water outlet which are not shown; an anode 5 and a cathode 6 which are a pair of electrodes disposed confronting each other such that at least portions thereof are immersed in for-treatment water in the treating chamber 4; a power supply 7 for energizing the electrodes 5 and 6; and a not-shown controller for controlling the electrode 7. In FIG. 1, numeral 10 denotes an agitating bar as agitation means for agitating the for-treatment water in the treating vessel 2.

The cathode 6 is formed of a conductive material containing or covered with an element in the group Ib or IIb of the periodic system, while the anode 5 is an insoluble electrode which contains insoluble metal such as platinum, iridium, palladium or an oxide thereof or is made of carbon.

Figure 2:
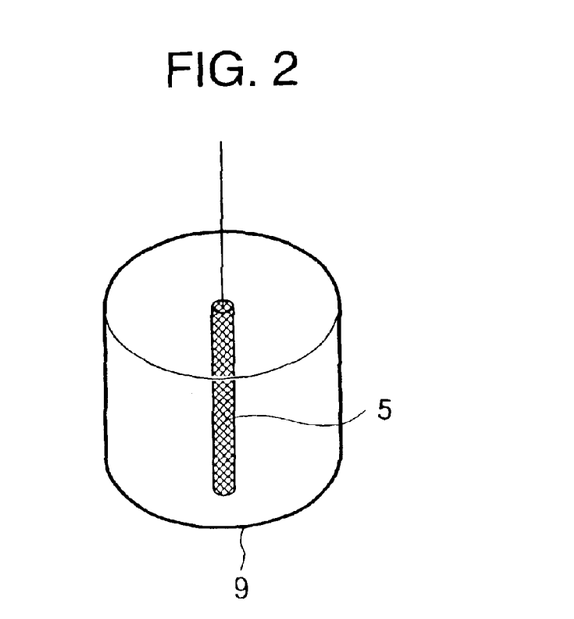
FIG. 2 is a diagram for explaining a constitution of an anode.

Further, a shielding member 9 is provided between the anode 5 and the cathode 6 in cylindrical form as shown in FIG. 2 such that it surrounds the anode 5. The shielding member 9 is formed of a non-conductive member such as glass fiber meshes or plastic meshes and prevents oxygen bubbles generated from the anode 5 from moving toward the cathode 6. In this case, ions present around the anode 5 can pass through the shielding member 9 and move toward the cathode 6.

With the arrangement described above, for-treatment water containing nitrate nitrogen and a phosphorus compound is reserved in the treating chamber 4 in the treating vessel 2, and the controller turns on the power supply 7, thereby energizing the cathode 6 and the anode 5. Thereby, on the cathode 6 side, nitrate ions contained in the for-treatment water are converted to nitrite ions through a reduction reaction (reaction A). Then, the nitrite ions produced through the reduction reaction of the nitrate ions are further converted to ammonia through a reduction reaction (reaction B). At this time, the vicinity of the cathode 6 becomes alkaline. The reactions A and B are shown below.

$$NO_3^- + H_2O + 2e^- \rightarrow NO_2^- + 2OH^-$$ Reaction A $$NO_2^- + 5H_2O + 6e^- \rightarrow NH_3(aq) + 7OH^-$$ Reaction B Meanwhile, on the anode 5 side, active oxygen and hypochlorous acid are generated from the surface of the anode 5. As a result, nitrogen gas is produced by means of a denitrifying effect of ammonia in the for-treatment water (reaction C). The reaction C is shown below.

$$NH_3(aq) + 3(O) \rightarrow N_2\uparrow + 3H_2O$$ Reaction C

Thereby, nitrogen compounds such as nitrate nitrogen, nitrite nitrogen and ammonia nitrogen in the for-treatment water can be treated efficiently.

Further, to treat the phosphorus compound in the for-treatment water, i.e., phosphate ions, calcium chloride is added to the for-treatment water. As a result, since the vicinity of the cathode 6 is alkaline as described above, calcium ions of calcium chloride added to the for-treatment water are agglomerated with the phosphate ions in the for-treatment water and precipitated through a dephosphorylation reaction so as to produce water-insoluble calcium hydroxyapatite (reaction D). The reaction D is shown below.

$$10Ca^{2+} + 2OH^- + 6PO_4^{3-} \rightarrow Ca_{10}(OH)_2(PO_4)_6$$ Reaction D

As shown by the reaction D, in order to agglomerate and precipitate 6 moles of the phosphate ions, 10 moles of the calcium ions are required. For this reason, calcium chloride is added to the for-treatment water in such an amount that a molar ratio of calcium ions of the calcium chloride to the phosphate ions contained in the for-treatment water would be 5/3 or more. When calcium ions are already present in the for-treatment water, calcium chloride may be added to the for-treatment water in such an amount that a molar ratio of calcium ions of the calcium chloride plus the already present calcium ions to the phosphate ions contained in the for-treatment water would be 5/3 or more.

As a result, calcium ions sufficient to agglomerate and precipitate the phosphate ions are present in the for-treatment water, thereby making it possible to agglomerate and precipitate phosphorus efficiently and improve treatment efficiency of phosphorus.

In general, to cause the dephosphorylation reaction (reaction D) to occur, a special chemical must be added so as to make the solution alkaline. However, addition of such a chemical is not necessary in the present invention since the vicinity of the cathode 6 is alkaline. Further, a solution rendered alkaline by a chemical or other means must be neutralized by a pH regulator upon draining. In the present invention, however, the adjustment of pH is not necessary.

Figure 3:
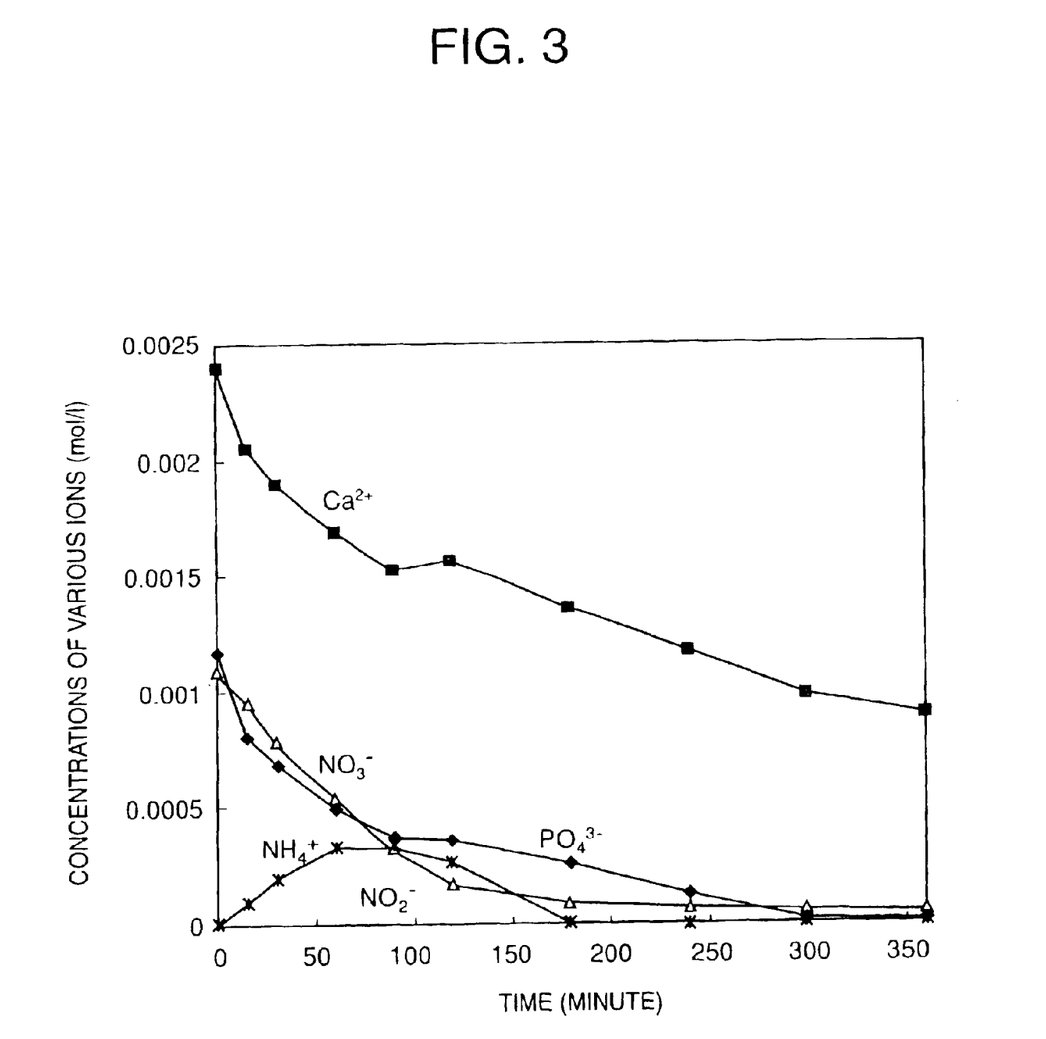
FIG. 3 is a diagram showing changes in concentrations of various ions.

Meanwhile, chloride ions of the calcium chloride added to the for-treatment water are oxidized at the anode 5 so as to produce chlorine (reaction E), and the produced chlorine reacts with water in the for-treatment water so as to produce hypochlorous acid (reaction F). Then, the produced hypochlorous acid reacts with ammonia present in the for-treatment water, undergoes a number of chemical changes, and is then converted to nitrogen gas (reaction G). The reactions E to G are shown below.

$$CaCl_2 \rightarrow Ca^{2+} + 2Cl^-$$

$$2Cl^- \rightarrow Cl_2 + 2e^-$$ Reaction E $$Cl_2 + H_2O \rightarrow HClO + HCl$$ Reaction F $$2NH_3 + 3HClO \rightarrow N_2\uparrow + 3HCl + 3H_2O$$ Reaction G Experimental results shown in FIG. 3 show changes in concentrations of various ions with time when 300 ml of 0.001 M potassium nitrate is electrolyzed by use of platinum or iridium-based electrodes as the anode 5 and the cathode 6 and addition of phosphoric acid and calcium chloride.

Referring to FIG. 3, at the cathode 6, nitrate ions are gradually changed to ammonium ions and decrease with time. After 170 minutes from the onset of the electrolysis, the nitrate ions are scarcely present in the for-treatment water. On the other hand, at the cathode 6, the ammonium ions are gradually increasingly produced, and after a lapse of a predetermined time, the ammonium ions react with chloride ions of the calcium chloride added to the for-treatment water, whereby the ammonium ions decrease gradually. Along with a decrease in the nitrate ions, the ammonium ions are scarcely present in the for-treatment water after 170 minutes from the onset of the electrolysis.

Further, in the vicinity of the anode 5, phosphate ions cause a dephosphorylation reaction with calcium ions of the calcium chloride, thereby causing the phosphate ions to precipitate at the bottom of the treating vessel 2 in the form of calcium hydroxyapatite. Therefore, the phosphate ions and the calcium ions used for dephosphorylation of the phosphate ions gradually decrease with time, and after 300 minutes from the onset of the electrolysis, the phosphate ions are scarcely present in the for-treatment water.

Thus, when calcium chloride is added to for-treatment water as described above, calcium ions are subjected to a dephosphorylation reaction and can accelerate the dephosphorylation reaction of phosphate ions in the for-treatment water. Further, in the treating vessel 2, reduction reactions of nitrate nitrogen and nitrite nitrogen to ammonia can be accelerated, so that a time required for the reduction reactions can be shortened.

Therefore, without an additional treating vessel, a phosphorus compound and a nitrogen compound can be treated in the same vessel, thereby making it possible to downsize the waste water treating apparatus 1.

Further, due to a denitrification reaction of ammonia produced from the cathode 6 with hypochlorous acid, nitrogen components such as nitrate nitrogen, ammonia nitrogen and a nitrogen compound can be removed effectively.

In addition, since phosphate ions can be condensed and precipitated by use of the fact that a pH around the cathode 6 is alkaline, there is no need to neutralize treated water.

Thereby, a nitrogen compound and phosphorus compound contained in for-treatment water discharged from ordinary households, factories and the like can be removed from the for-treatment water efficiently, and efficiency of treatments of the nitrogen compound and the phosphorus compound is increased.

Next, a waste water treating apparatus 20 as another embodiment will be described with reference to FIG. 4. The apparatus 20 in the present embodiment has nearly the same constitution as that of the waste water treating apparatus 1 which has been described above with reference to FIGS. 1 and 2. Therefore, descriptions about constituents common between the apparatuses will be omitted. Further, in FIG. 4, constituents indicated by the same numerals as those found in FIG. 1 exhibit the same or similar functions of constituents in FIG. 1 which are indicated by the numerals.

The waste water treating apparatus 20 in the present embodiment has, in addition to the constitution of the waste water treating apparatus 1 in the aforementioned embodiment, an iron bar 15 as an iron material in the treating vessel 2. The iron bar 15 is fixed by means of a suspending member 16 as positioning means so as to be parallel to the cathode 6 and the anode 5. In this case, the iron bar 15 is positioned between the anode 5 and the cathode 6 and beyond a line connecting an end of the anode 5 such as the lower end of the anode 5 and an end of the cathode 6 such as the lower end of the cathode 6, e.g., in the present embodiment, lower than the lower ends of the electrodes.

Figure 4:
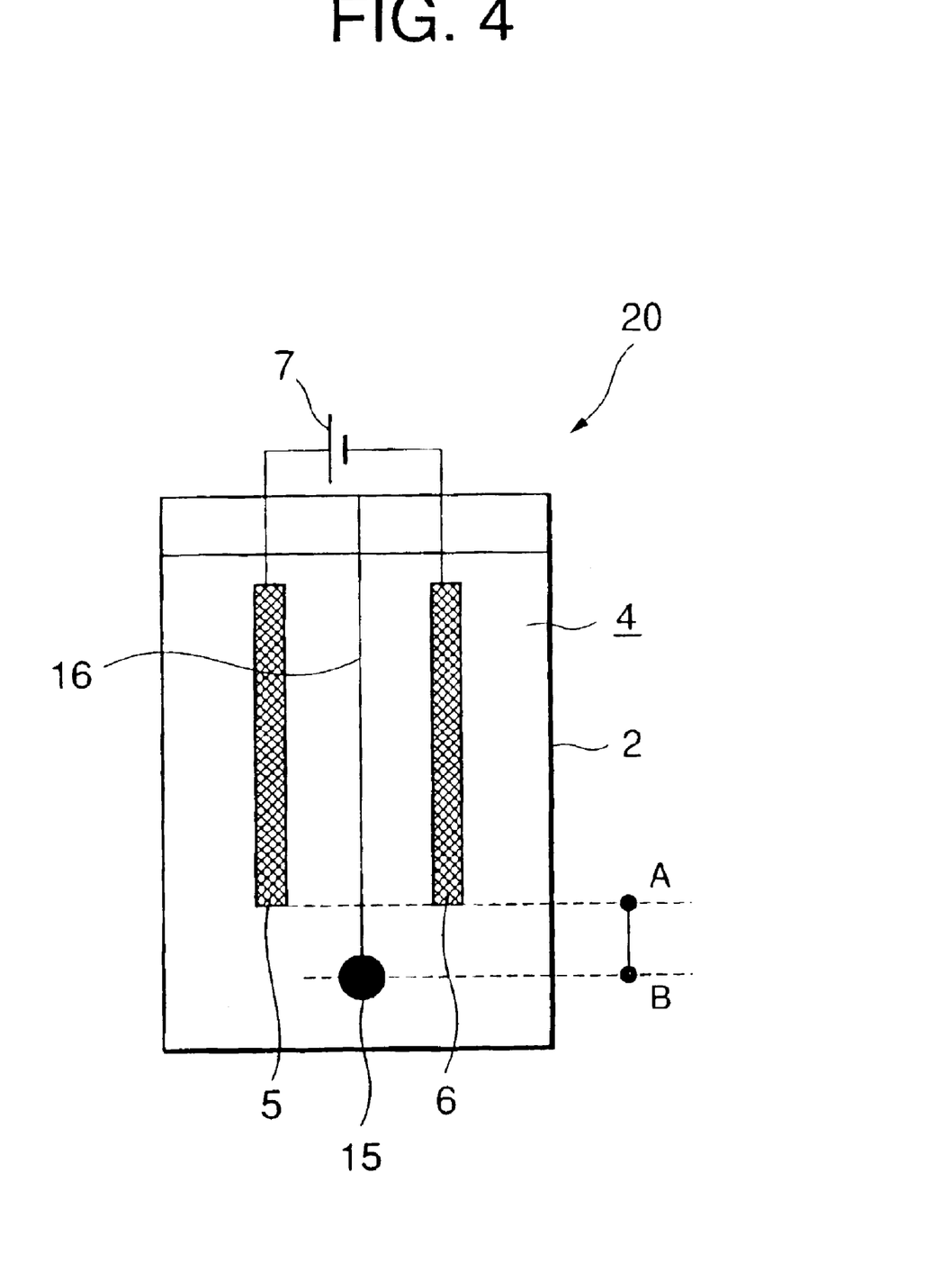
FIG. 4 is a diagram showing a constitution inside a treating vessel.

Further, the iron bar 15 can be moved freely by means of the suspending member 16 between, for example, the lower ends (position indicated as A in FIG. 4) of the anode 5 and the cathode 6 and a position (position indicated as B in FIG. 4) which is apart from the lower ends of the anode 5 and the cathode 6 at a predetermined distance as shown in FIG. 4. Although the suspending member 16 is used as the positioning means in the present embodiment, a holding member for fixing both ends of the iron bar 15 to the internal wall of the treating vessel 2 may be used in place of the suspending member. In addition, although the iron material in the present embodiment takes the form of the iron bar 15, the iron material may be used in a form other than a bar.

With the arrangement described above, for-treatment water containing nitrate nitrogen and a phosphorus compound is reserved in the treating chamber 4 in the treating vessel 2, and the controller turns on the power supply 7, thereby energizing the cathode 6 and the anode 5. Thereby, on the cathode 6 side, as in the aforementioned embodiment, nitrate ions contained in the for-treatment water are converted to nitrite ions through a reduction reaction (reaction A). Then, the nitrite ions produced through the reduction reaction of the nitrate ions are further converted to ammonia through a reduction reaction (reaction B).

Meanwhile, on the anode 5 side as well, active oxygen and hypochlorous acid are generated from the surface of the anode 5 as in the aforementioned embodiment. As a result, nitrogen gas is produced by means of a denitrifying effect of ammonia in the for-treatment water (reaction C).

Thereby, nitrogen compounds such as nitrate nitrogen, nitrite nitrogen and ammonia nitrogen in the for-treatment water can be treated effectively. Particularly, in the present embodiment, a conductive material containing or covered with an element in the group Ib or IIb of the periodic system, such as brass which is an alloy of copper and zinc, is used in the cathode 6, reduction reactions of the nitrate nitrogen and nitrite nitrogen in the for-treatment water to ammonia can be further accelerated, and a time required for the reduction reactions can be further shortened.

Further, from the iron bar 15 in the for-treatment water, iron ions are produced due to potentials applied to the anode 5 and the cathode 6. These iron ions are agglomerated with phosphate ions in the for-treatment water and precipitated through a dephosphorylation reaction so as to produce water-insoluble iron phosphate (reaction H). The reaction H is shown below.

$$Fe^{3+} + PO_4^{3-} \rightarrow FePO_4 \qquad \text{Reaction H}$$

At this time, the position of the iron bar 15 is adjusted by means of the suspending member 16 according to an amount of the phosphate compound contained in the for-treatment water. That is, when the amount of the phosphate compound contained in the for-treatment water is large, the iron bar 15 is moved to the position A so as to increase an amount of iron eluted from the iron bar 15. This brings the iron bar 15 relatively close to the anode 5 and the cathode 6, so that the amount of the iron eluted from the iron bar 15 is kept constant and the eluted iron is agglomerated with the phosphate ions in the for-treatment water and precipitated.

Meanwhile, when the amount of the phosphate compound contained in the for-treatment water is small, the iron bar 15 is moved to the position B so as to control the amount of the iron eluted from the iron bar 15. This moves the iron bar 15 away from the anode 5 and the cathode 6 at least at a predetermined distance, so that the amount of the iron eluted from the iron bar 15 can be controlled and excessive elution of the iron can be avoided.

Although the position of the iron bar 15 is limited in the present embodiment, the phosphorus compound in the for-treatment water can still be removed even if the iron bar 15 is disposed at a position other than the limited positions of the iron bar 15, e.g., a position between the anode 5 and the cathode 6 or a position which is neither between nor in contact with the anode 5 and the cathode 6. Further, as compared with a case where the iron bar 15 is disposed in contact with the anode 5 and the cathode 6, moderate potentials can be applied to the iron bar 15 so as to control the amount of iron to be eluted. Thereby, maintenance workability including replacement of the iron bar 15 can be alleviated and undesired elution of iron can also be reduced.

Thus, by changing the position of the iron bar 15, the potentials applied to the iron bar 15 can be controlled so as to control the amount of iron eluted from the iron bar 15. Thereby, the amount of the iron to be eluted can be changed according to the amount of the phosphorus compound contained in the for-treatment water, so that excessive elution of iron can be avoided.

Figure 5:
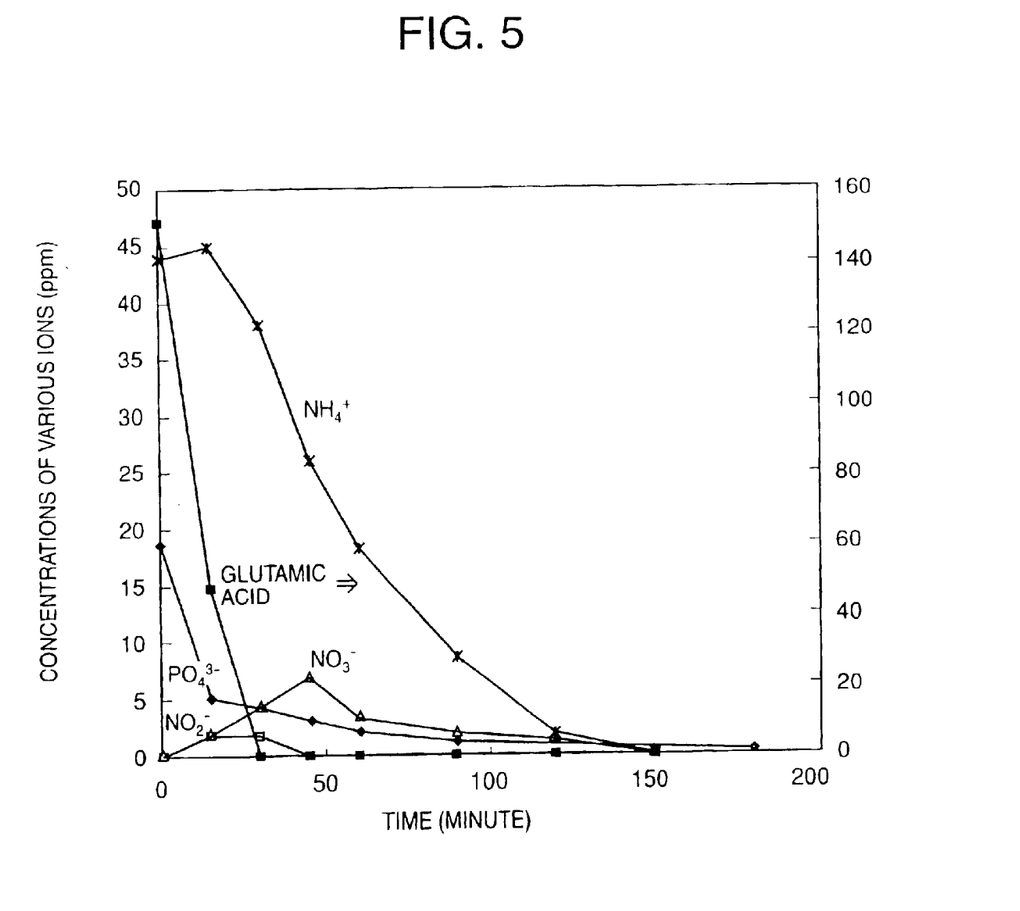
FIG. 5 is a diagram showing changes in concentrations of various ions.

Meanwhile, experimental results shown in FIG. 5 show changes in concentrations of various ions with time when ordinary domestic waste water as for-treatment water is electrolyzed by use of platinum or iridium-based electrodes as the anode 5 and the cathode 6.

Referring to FIG. 5, glutamic acid which is a nitrogen compound contained in the for-treatment water is gradually changed to ammonium ions by the electrolysis and therefore decreases with time. After 30 minutes from the onset of the electrolysis, the glutamic acid is scarcely present in the for-treatment water. On the other hand, nitrate ions are increased by oxidation of nitrite ions in the for-treatment water once and then gradually changed to ammonium ions at the cathode 6. The nitrate ions decrease with time, and after 150 minutes from the onset of the electrolysis, the nitrate ions are scarcely present in the for-treatment water. The ammonium ions produced at the cathode 6 gradually increase, and after a lapse of a predetermined time, the ammonium ions gradually decrease. After 150 minutes from the onset of the electrolysis, the ammonium ions are scarcely present in the for-treatment water.

Further, in the vicinity of the anode 5, phosphate ions in the for-treatment water cause a dephosphorylation reaction with iron ions resulting from elution of iron from the iron material 15 which is influenced by the potentials on the anode 5 and the cathode 6 so as to precipitate at the bottom of the treating vessel 2 in the form of iron phosphate. Therefore, the phosphate ions gradually decrease with time, and after 170 minutes from the onset of the electrolysis, the phosphate ions are scarcely present in the for-treatment water.

Thus, the iron ions required to remove the phosphate ions in the for-treatment water can be supplied from the iron material 15 which is provided at a position apart from the anode 5 and the cathode 6 as described above, thereby making it possible to treat the phosphorus compound in the for-treatment water efficiently.

Further, in this case, since the iron material 15 is positioned away from the anode 5 and the cathode 6, moderate potentials are applied to the iron material 15. Thereby, excessive elution of iron can be inhibited, and a nitrogen compound and a phosphorus compound can be treated simultaneously in the same treating vessel 2.

Hence, a nitrogen compound and phosphorus compound contained in for-treatment water discharged from ordinary households, factories and the like can be removed from the for-treatment water efficiently, and efficiency of waste water treatment is increased.

In addition, without an additional treating vessel, a phosphorus compound and a nitrogen compound can be treated in the same vessel, thereby making it possible to downsize the treating apparatus.

Furthermore, since the iron material 15 is positioned between the anode 5 and the cathode 6, further moderate potentials are applied to the iron material 15, thereby making it possible to inhibit excessive elution of iron. In addition, in the present embodiment, since the position of the iron material 15 is also beyond a line connecting an end of the anode 5 to an end of the cathode 5, the amount of iron eluted from the iron material 15 can be controlled further moderately.

Figure 6:
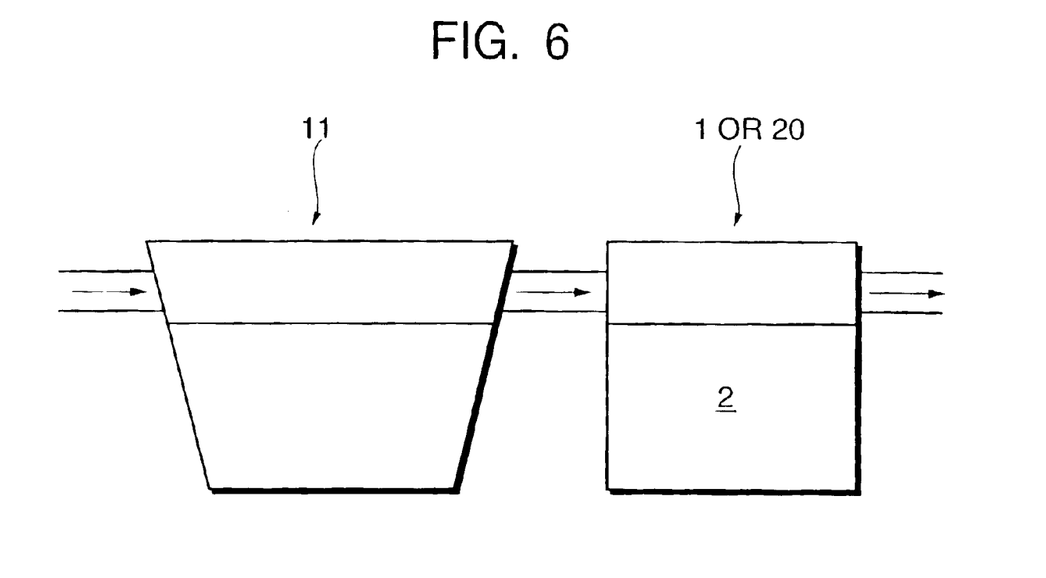
FIG. 6 is a diagram for explaining a first specific application example of the present invention.

Further, in a first specific application example of the present invention, for-treatment water is reserved in a biological process purifying vessel, i.e., a so-called activated sludge process vessel 11 in the present example as shown in FIG. 6, and after COD and BOD are removed in the activated sludge process vessel 11, the for-treatment water subjected to the COD and BOD process is introduced into the treating vessel 2 of the waste water treating apparatus 1 or 20 to which the present invention is applied so as to treat a nitrogen compound and a phosphorus compound.

Thus, since the nitrogen compound and the phosphorus compound can be treated in the waste water treating apparatus 1 or 20 after the for-treatment water is subjected to the COD and BOD process in the activated sludge process vessel 11, the for-treatment water can be treated effectively. Further, although the for-treatment water processed in the activated sludge process vessel 11 contains bacteria generated in the activated sludge process vessel 11, the for-treatment water is sterilized with hypochlorous acid or active oxygen in the waste water treating apparatus 1 or 20 as described above, so that the treated water can be discharged in the state suitable for environment.

Figure 7:
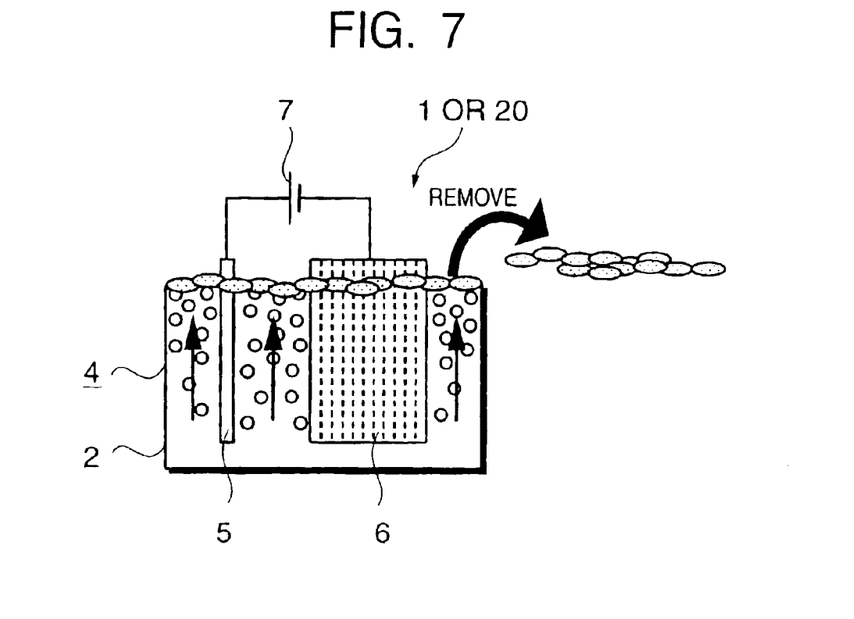
FIG. 7 is a diagram for explaining a second specific application example of the present invention.

Further, in a second specific application example of the present invention, floating substances in for-treatment water can be removed based on so-called electrolytic surfacing as shown in FIG. 7.

Figure 8:
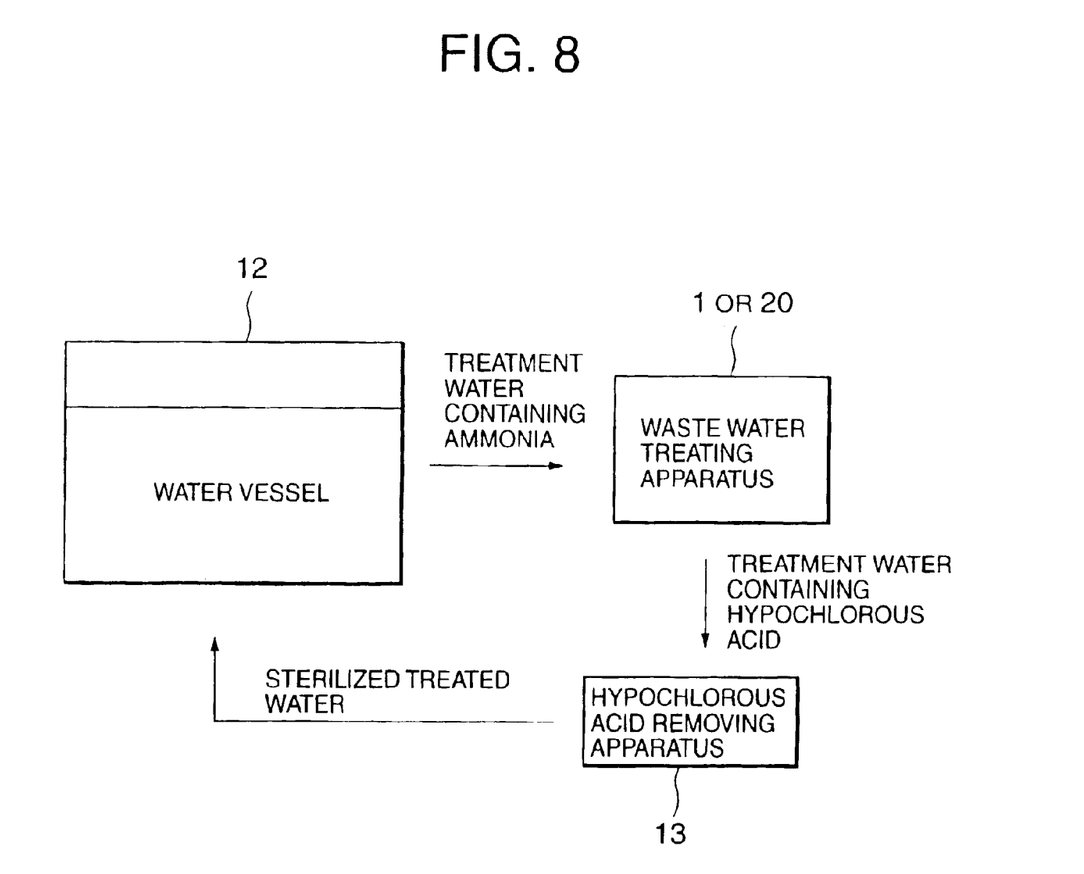
FIG. 8 is a diagram for explaining a third specific application example of the present invention.

Still further, in a third specific application example of the present invention, the waste water treating apparatus 1 or 20 can be used for removing nitrogen compounds and phosphorus compounds contained in water reserved in a water vessel 12 where fishes are kept in a fish preserve, aquarium or the like, as shown in FIG. 8. Since the water in the water vessel where fishes are kept is significantly contaminated with nitrogen compounds such as ammonia discharged from the fishes, the water in the water vessel needs to be exchanged regularly. For this reason, the water in the water vessel 12 which contains nitrogen compounds is introduced into the waste water treating apparatus 1 or 20 so as to treat the nitrogen compounds, the treated water discharged from the waste water treating apparatus 1 or 20 is then introduced into a hypochlorous acid removing apparatus 13 so as to remove hypochlorous acid in the treated water, and the resulting treated water is returned to the water vessel 12.

Thereby, there is no need to exchange the water in the water vessel 12 regularly, so that the maintenance workability of the water vessel 12 can be improved. Further, the treated water reserved in the waste water treating apparatus 1 or 20 is sterilized by hypochlorous acid before returned to the water vessel 12, whereby the survival rate of fishes in the water vessel 12 can be improved.

In addition to the foregoing, the waste water treating method and apparatus to which the present invention is applied can also be applied to purification of for-treatment water in swimming pools or baths, or purification of well water or underground water, or the like.

As described above, according to the present invention, in a method for treating a nitrogen compound and a phosphorus compound in for-treatment water by an electrochemical process, a metal material constituting a cathode is a conductive material, a conductive material constituting an anode is an insoluble material or carbon, and there is carried out at lease one of a step of adding calcium chloride to the for-treatment water and a step of immersing an iron material in the for-treatment water.

When calcium chloride is added, chloride ions of the calcium chloride cause ammonia in the for-treatment water to have a denitrification reaction with a substance such as hypochlorous acid, whereby nitrogen components such as nitrate nitrogen, ammonia nitrogen and a nitrogen compound can be removed effectively. In addition, since phosphate ions can be condensed and precipitated by use of the fact that a pH around the cathode is alkaline, there is no need to neutralize treated water.

Further, according to the present invention, in addition to the above invention, when the iron material is not immersed in the for-treatment water, a molar ratio of calcium ions contained in the for-treatment water to phosphate ions contained in the for-treatment water is 5/3 or more. Hence, when the calcium ions are present in the for-treatment water in an amount sufficient to agglomerate and precipitate the phosphate ions, phosphorus can be agglomerated and precipitated effectively, and treatment efficiency of phosphorus can be improved.

Further, according to the present invention, a waste water treating apparatus for treating a nitrogen compound and a phosphorus compound in for-treatment water by an electrochemical process comprises a treating vessel for reserving the for-treatment water, a cathode which is at least partially immersed in the for-treatment water and which is made of a conductive material, an anode which is at least partially immersed in the for-treatment water and which is made of a conductive insoluble material or carbon, and at least either one or both of calcium chloride addition means for adding calcium chloride to the for-treatment water and an iron material to be immersed in the for-treatment water. Therefore, as in the case of the above invention, when calcium chloride is added, chloride ions of the calcium chloride cause ammonia in the for-treatment water to have a denitrification reaction with a substance such as hypochlorous acid, whereby nitrogen components such as nitrate nitrogen, ammonia nitrogen and a nitrogen compound can be removed effectively. In addition, since phosphate ions can be condensed and precipitated by use of the fact that a pH around the cathode is alkaline, there is no need to neutralize treated water.

Further, when the iron material is immersed in the for-treatment water, moderate potentials are applied to the iron material. Thereby, excessive elution of iron can be inhibited, and a nitrogen compound and a phosphorus compound can be treated simultaneously in the same treating vessel.

Further, in the present invention, when the iron material is immersed in the for-treatment water, the iron material is positioned between the anode and the cathode, so that further moderate potentials are applied to the iron material. Thereby, excessive elution of iron can be inhibited, and a nitrogen compound and a phosphorus compound can be treated simultaneously in the same treating vessel.

In addition, in the present invention, when the iron material is immersed in the for-treatment water, the iron material is positioned beyond a line connecting an end of the anode to an end of the cathode, whereby potentials applied to the iron material from the anode and the cathode can be controlled moderately. Therefore, the amount of iron eluted from the iron material can be controlled further moderately, so that a nitrogen compound and a phosphorus compound can be treated simultaneously in the same treating vessel.

Furthermore, in the present invention, when the iron material is immersed in the for-treatment water, the iron material is fixed to the treating vessel by positioning means, and the positioning means can change a spacing between the iron material and the anode or the cathode by moving the iron material freely. By operating the positioning means, the spacing between the iron material and the anode or the cathode can be changed according to the amount of the phosphorus compound existing in the for-treatment water. Thus, when the amount of the phosphorus compound existing in the for-treatment water is small, the spacing between the anode or the cathode and the iron material is increased, whereby elution of iron from the iron material can be significantly suppressed so as to avoid excessive elution of iron. Meanwhile, when the amount of the phosphorus compound existing in the for-treatment water is large, the spacing between the anode or the cathode and the iron material is decreased, whereby the amount of iron eluted from the iron material can be increased so as to obtain eluted iron in an amount sufficient to treat the phosphorus compound in the for-treatment water.

Thereby, nitrogen compounds and phosphorus compounds contained in for-treatment water discharged from ordinary households, factories and the like can be removed from the for-treatment water efficiently, and efficiency of treatment of waste water is increased.

Further, without an additional treating vessel, a phosphorus compound and a nitrogen compound can be treated in the same vessel, thereby making it possible to downsize the treating apparatus which implements the present invention.

Furthermore, according to the present invention, as the metal material which constitutes the cathode, a conductive material containing or covered with an element in the group Ib or IIb of the periodic system is used. Hence, reduction reactions of nitrate nitrogen and nitrite nitrogen in the for-treatment water to ammonia can be further accelerated, and a time required for the reduction reactions can be further shortened.

Still further, according to the present invention, in addition to the above inventions, the for-treatment water is water treated in a biological process purifying vessel. Therefore, to discharge the for-treatment water, COD and BOD are removed from the for-treatment water to a high degree in the biological process purifying vessel such as an activated sludge process vessel, and the for-treatment water is further sterilized with hypochlorous acid or active oxygen for bacteria generated in the activated sludge process vessel.

Further, according to the waste water treating system of the present invention, a waste water treating apparatus for treating a nitrogen compound and a phosphorus compound in for-treatment water by the above waste water treating method is disposed subsequently to a biological process purifying vessel. Therefore, to discharge the for-treatment water, COD and BOD are removed from the for-treatment water to a high degree in the biological process purifying vessel such as an activated sludge process vessel, and the for-treatment water is further sterilized with hypochlorous acid or active oxygen for bacteria generated in the activated sludge process vessel.

What is claimed is:

1. A waste water treating method for treating a nitrogen compound and a phosphorus compound in for-treatment water by an electrochemical process, comprising providing in the for-treatment water a metal material constituting a cathode which is a conductive material, providing in the for-treatment water a conductive material constituting an anode which is an insoluble material or carbon, carrying out a step of suspending an iron material in the for-treatment water by means of a suspending member, said iron material being moveable in the for-treatment water, and moving the iron material according to an amount of the phosphorus compound contained in the for-treatment water.

2. The method of claim 1, wherein as the metal material constituting the cathode, a conductive material containing or covered with an element in the group Ib or IIb of the periodic system is used.

3. A waste water treating apparatus for treating a nitrogen compound and a phosphorus compound in for-treatment water by an electrochemical process, comprising:

a treating vessel for reserving the for-treatment water, a cathode which is at least partially immersed in the for-treatment water and which is made of a conductive material, an anode which is at least partially immersed in the for-treatment water and which is made of a conductive insoluble material or carbon, and an iron material to be immersed in the for-treatment water, wherein said iron material is suspended by a suspending member and said iron material is moveable in the for-treatment water.

4. The apparatus of claim 3, wherein as the conductive material constituting the cathode, a conductive material containing or covered with an element in the group Ib or IIb of the periodic system is used.

5. The apparatus of claim 3, wherein when the iron material is immersed in the for-treatment water, the iron material is positioned between the anode and the cathode.

6. The method of claim 1 or 2, wherein the for-treatment water is water treated in a biological process purifying vessel.

7. The apparatus of claim 4, wherein when the iron material is immersed in the for-treatment water, the iron material is positioned between the anode and the cathode.

8. The apparatus of claim 3, 4, 5, or 7, wherein the for-treatment water is water treated in a biological process purifying vessel.

9. A waste water system having a waste water treating apparatus for treating a nitrogen compound and a phosphorus compound in for-treatment water by t waste water treating apparatus of claim 3, 4, 5, or 7 disposed subsequently to a biological process purifying vessel.

10. A waste water treating method for treating a nitrogen compound and a phosphorus compound in for-treatment water by an electrochemical process, comprising providing in the for-treatment water a metal material constituting a cathode which is a conductive material containing or covered with an element in the group Ib or IIb of the periodic system, providing in the for-treatment water a conductive material constituting an anode which is an insoluble material or carbon, and carrying out a step of adding calcium chloride to the for-treatment water to obtain a molar ratio of calcium ions contained in the for-treatment water to phosphate ions contained in the for-treatment water of 5/3 or more.

11. A waste water treating apparatus for treating a nitrogen compound and a phosphorus compound in for-treatment water by an electrochemical process, comprising:

a treating vessel for reserving the for-treatment water, a cathode which is at least partially immersed in the for-treatment water and which is made of a conductive material, an anode which is at least partially immersed in the for-treatment water and which is made of a conductive insoluble material or carbon, and immersed in the for-treatment water, said iron material being positioned between the anode and the cathode beyond a line connecting an end of the anode to an end of the cathode.

12. A waste water treating apparatus for treating a nitrogen compound and a phosphorus compound in for-treatment water by an electrochemical process, comprising:

a treating vessel for reserving the for-treatment water, a cathode which is at least partially immersed in the for-treatment water and which is made of a conductive material, an anode which is at least partially immersed in the for-treatment water and which is made of a conductive insoluble material or carbon, and an iron material immersed in the for-treatment water, wherein the iron material is fixed to the treating vessel by positioning means, and the positioning means can change a spacing between the iron material and the anode or the cathode by moving the iron material freely.

13. The method of claim 10, wherein the for-treatment water is water treated in a biological process purifying vessel.

14. The apparatus of claim 11 or 12, wherein the for-treatment water is water treated in a biological process purifying vessel.

15. A waste water treating system having a waste water treating apparatus for treating a nitrogen compound and a phosphorus compound in for-treatment water by the waste water treating apparatus of claim 11 or 12 disposed subsequently to a biological process purifying vessel.

16. A waste water treating system having a waste water treating apparatus for treating a nitrogen compound and a phosphorus compound in for-treatment water by an electrochemical process, comprising:

a treating vessel for reserving the for-treatment water, a cathode which is at least partially immersed in the for-treatment water and which is made of a conductive material, an anode which is at least partially immersed in the for-treatment water and which is made of a conductive insoluble material or carbon, an iron material immersed in the for-treatment water, and a biological process purifying vessel, for processing said for-treatment water, arranged in the system prior to said treating vessel.

17. The waste water treating system of claim 16, wherein said cathode which is at least partially immersed in the for-treatment water is made of conductive material containing or covered with an element in the group Ib or IIb of the periodic system.

18. A waste water treating system having a waste water treating apparatus for treating a nitrogen compound and a phosphorus compound in for-treatment water by an electrochemical process, comprising:

a treating vessel for reserving the for-treatment water, a cathode which is at least partially immersed in the for-treatment water and which is made of a conductive material containing or covered with an element in the group Ib or IIb of the periodic system, an anode which is at least partially immersed in the for-treatment water and which is made of a conductive insoluble material or carbon, a calcium chloride addition means for adding calcium chloride to the for-treatment water for obtaining a molar ratio of calcium ions contained in the for-treatment water to phosphate ions contained in the for-treatment water of 5/3 or more, and a biological process purifying vessel, for processing said for-treatment water, arranged in the system prior to said treating vessel.

* * * * *